United States Patent [19]

Sudakoff et al.

[11] Patent Number: 4,953,880
[45] Date of Patent: Sep. 4, 1990

[54] JOGGING STROLLER

[75] Inventors: Carle H. Sudakoff; Billie D. Matthews, both of San Clemente, Calif.

[73] Assignee: Tandem Mfg., Inc., San Clemente, Calif.

[21] Appl. No.: 299,132

[22] Filed: Jan. 23, 1989

[51] Int. Cl.⁵ .................................. B62B 7/14
[52] U.S. Cl. ................... 280/47.38; 280/658
[58] Field of Search ............... 403/106; 280/47.38, 280/62, 250.1, 647, 657, 658, 644, 650; 297/440

[56] References Cited

U.S. PATENT DOCUMENTS

| | | |
|---|---|---|
| 3,636 | 9/1869 | Christian . |
| D. 204,254 | 4/1966 | Cerf ........................ D14/14 |
| D. 239,523 | 4/1976 | Firth et al. ................ D12/129 |
| D. 274,714 | 7/1984 | Cone ......................... D12/129 |
| D. 297,525 | 9/1988 | Baechler ................... D12/129 |
| 699,186 | 5/1902 | Katzke . |
| 2,854,241 | 9/1958 | Dobrowolski ......... 280/47.38 X |
| 3,781,031 | 12/1973 | Patin ............................ 280/62 |
| 3,912,032 | 10/1975 | Benz et al. .............. 280/250.1 X |
| 4,346,912 | 8/1982 | Habib ............................ 280/644 |
| 4,360,213 | 11/1982 | Rudwick et al. .......... 280/250.1 |
| 4,618,184 | 10/1986 | Harvey .......................... 297/19 |
| 4,757,868 | 7/1988 | Cresswell ............... 280/250.1 X |

OTHER PUBLICATIONS

Racing Strollers, Inc.–Catalog, 4 pages.

*Primary Examiner*—Richard A. Bertsch
*Assistant Examiner*—Michael Mar
*Attorney, Agent, or Firm*—Stetina and Brunda

[57] ABSTRACT

A stroller device for carrying infant children which is particularly adapted to convey an infant while its user engages in jogging or running activities while being formed of a plurality of releasably interconnectable segments which permit the stroller to be rapidly disassembled without the need for tools, into a compact configuration for storage. The segments can be likewise rapidly reconnected, also without the need for tools, for use in the above applications.

7 Claims, 2 Drawing Sheets

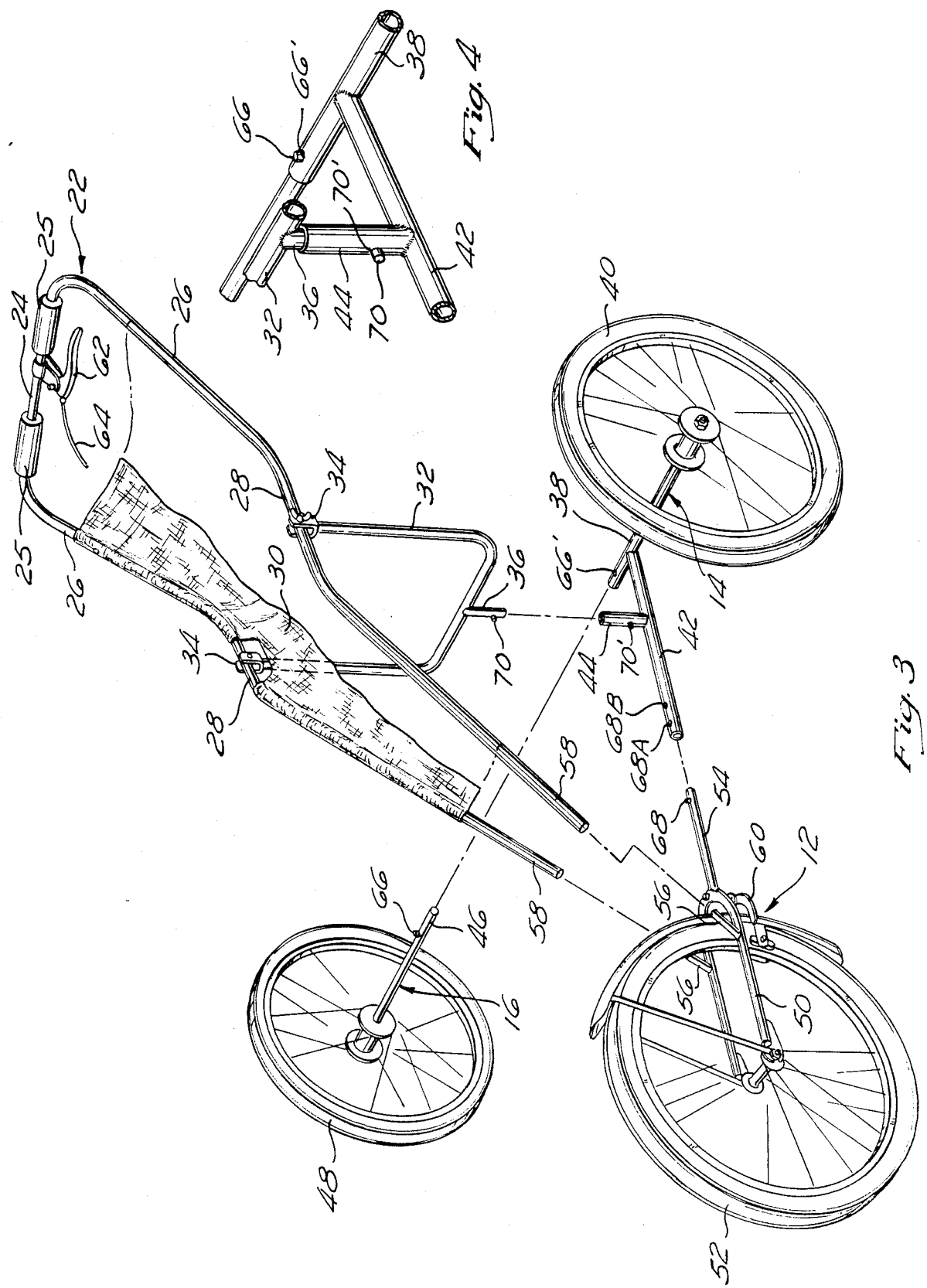

4,953,880

1

JOGGING STROLLER

FIELD OF THE INVENTION

The present invention relates generally to carriages or strollers for carrying infant children, and more particularly to a stroller which is adapted for carrying infants while the user engages in jogging or running activities and which may be rapidly disassembled into segments for stowage.

BACKGROUND OF THE INVENTION

As is well known, carriages or strollers utilized to carry infants typically comprise a basket-like seat disposed in a frame supported by three or four wheels. Generally, these devices are designed to be pushed along at no more than a walking speed on relatively smooth surfaces such as pavement, and are therefore fitted with small diameter wheels and frame members having strength and resilience properties which limit their application to these conditions. For those who have infant children it is oftentimes desirable, such as for purposes of convenience, to take the infant along while engaging in running or jogging activities. As such, there exists a need for an infant stroller adapted to roll at jogging or running speeds on a variety of running surfaces typically utilized by joggers, such as unpaved trails, lawn areas and beaches. In recognition of this need, it is heretofore known in the prior art to provide a stroller with a lightweight frame supported by larger diameter wheels fitted with pneumatic tires as depicted in U.S. Pat. No. Des. 297,525 issued to Bacchler. It has been found, however, that while such a device is adapted for the jogging conditions described above, it is limited in utility in that it is too large, even when made collapsible, to fit into most automobile trunks (when folded or collapsed these devices extend into a more elongate configuration which is too long to fit within an automobile trunk). This lack of stowability for transport particularly reduces the utility of such devices in that it is often desirable to take them along for use at destinations such as camping sites or otherwise necessary to travel over distances by automobile to reach a desired jogging location such as a beach or trail.

In view of the above, there exists a substantial need in the art for an infant stroller device which is adapted both for use in the jogging applications described above and for compact stowage as in an automobile trunk.

SUMMARY OF THE INVENTION

The present invention specifically addresses and satisfies the above referenced need in the art by providing a stroller device which can be rapidly disassembled into segments as for stowage and reassembled for use without the need for tools. The segments fit readily into relatively small stowage areas such as automobile trunks and room closets. The strength and resilience of the frame and wheels of the present invention make it suitable for use while engaging in jogging activities on a variety of surfaces.

DESCRIPTION OF THE DRAWINGS

These and other features of the present invention will become more apparent upon reference to the drawings wherein:

FIG. 3 is an exploded perspective view of the segments comprising the preferred embodiment of the present invention;

FIG. 4 is a detail perspective view illustrating the interconnected construction of the frame segments in the preferred embodiment of the present invention.

DETAILED DESCRIPTION OF THE PREFERRED EMBODIMENT

Figure 1:
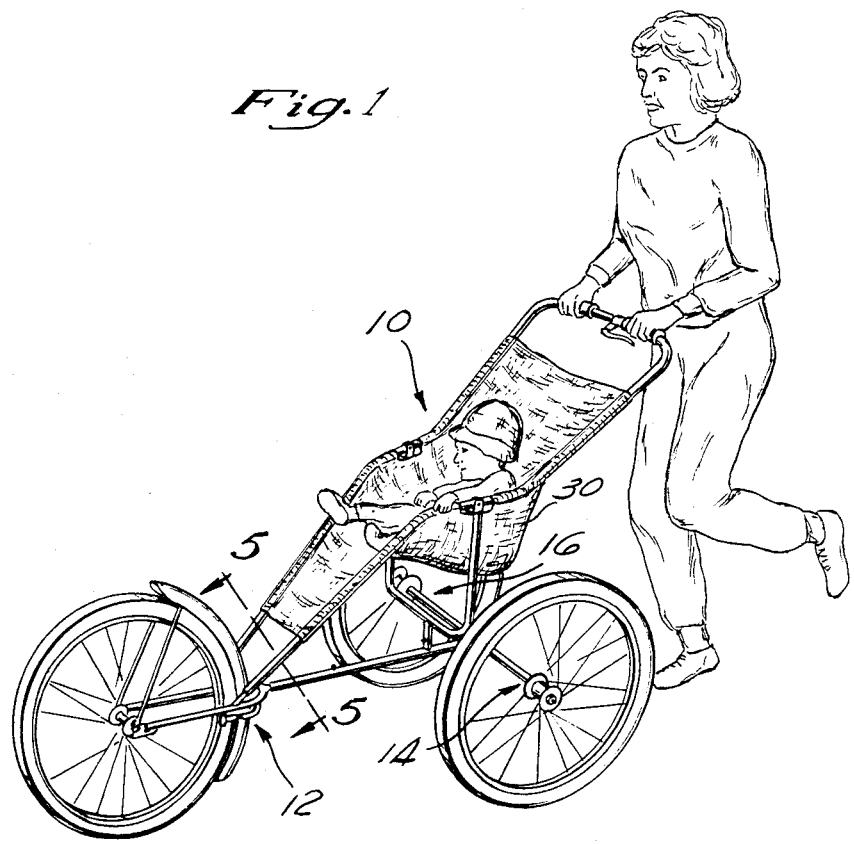
FIG. 1 is a perspective view of the preferred embodiment of the present invention.

Referring to FIG. 1, there is shown the preferred embodiment of the jogging stroller device formed in accordance with the present invention, composed generally of a plurality of frame segments which in the preferred embodiment include an infant support segment 10, a front fork segment 12, a first rear axle segment 14 and a second rear axle segment 16, which are interconnectable without the need for tools as by way of a releasable fasteners to permit the rapid assembly and disassembly of the stroller device. Each segment 10, 12, 14, 16 is preferably formed, in part, from tubular metal frame members which generally may be connected together as by way of weldments or other rigid connection means.

Figure 2:
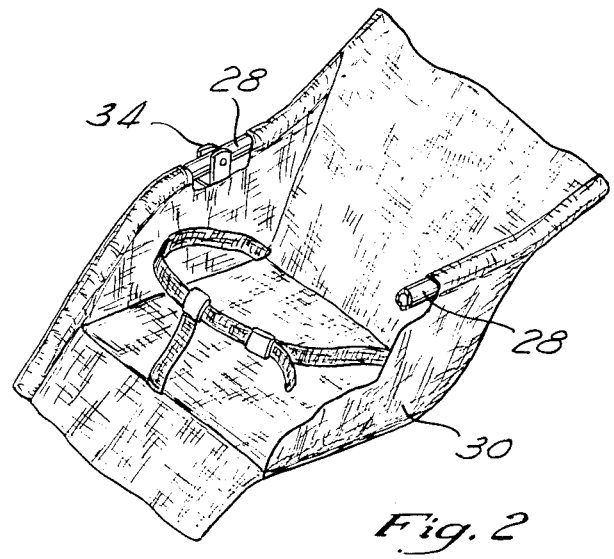
FIG. 2 is a detail perspective view showing the stroller seat portion of the preferred embodiment of the present invention.

Referring more particularly to FIGS. 2 and 3, it can be seen that the infant support segment 10 includes an upper support member 22 which has a forwardly downward inclined orientation when the present invention is assembled, and which itself further comprises a handlebar portion 24 with handgrips 25 and two elongate lateral portions 26, each having a generally S-shaped curve located centrally along the length thereof to form arm rest portions 28. A stroller seat 30, typically formed from a fabric material, is affixed to the upper support member 22 by folding over the peripheral sides thereof forming two lateral channels through which lateral portions 26 are slidingly inserted. The infant support segment 10 further includes a generally U-shaped vertically oriented lower support member 32, which is pivotally connected at its two upper distal ends to the arm rest portions 28 of upper support member 22 as by way of pin and clevis connections, 34 with the pin portions thereof preferrably consisting of bolts threadingly cooperating with lock nuts. A seat post portion 36 extends vertically downward from the mid-point of the lower horizontal portion of lower support member 32.

The first rear axle segment 14 comprises a left rear axle portion 38, connected rotatably at one end to a left rear wheel 40, and to a rear spine portion 42 at a distance proximal from the other end so that rear spine member 42 extends horizontally forward from the midpoint of the rear axle assembly when the frame segments are interconnected. A seat post receiving portion 44 extends normally and vertically from rear spine portion 42.

The second rear axle segment 16 consists of a right rear axle portion 46, rotatably connected at one end to a right rear wheel 48.

The front fork segment 12 includes a fork portion 50 rotatably connected to a front wheel 52, and having a forward spine portion 54 positioned to extend horizontally rearward for connecting together segments 12 and 14. A pair of post portions 56 extend from the upper side of the fork portion 50 and are positioned to align coaxially with the forward ends 58 of upper support member 26 for insertion therewithin when segments 10 and 12 are connected. The front fork segment 12 may also include a braking means, such as a caliper-type rim brake 60 as is typically utilized in bicycle applications, operated as by way of a handbrake lever 62 mounted on the handlebar portion 24 of infant support segment 10 via an actuator cable 64 (only partially shown). The wheels 40, 48, 52 preferably consist of wire spoke wheels fitted with pneumatic tires.

The present invention includes means for connecting the frame segments together, which in the preferred embodiment comprises forming tubular couplings, wherein right rear axle portion 46, forward spine portion 54, post portions 56 and seat post 36 are sized to form insert portions, i.e. they are diametrically sized to be slidingly received or inserted within the interiors of receiving portions 38, 42, 58 and 44 respectively, to connect together the corresponding frame segments. The present invention further includes retaining means for releasably retaining the segments in their connected configuration, which in the preferred embodiment comprises button/aperture fasteners wherein a retaining button positioned on the outer lateral side of each insert portion is normally spring biased or otherwise maintained to protrude outwardly but which may be depressed inwardly as by way of finger pressure until flush with the insert portion lateral side. As such, the retaining button can be depressed to permit the insert portion to slide unobstructed into the interior of the corresponding receiving portion until the retaining button engages a complementary aperture on the lateral side of the receiving portion i.e. the retaining button aligns with and biases outwardly through the aperture wherein the lateral sides of the retaining button abut the aperture sides and thereby prevent the insert portion from sliding further in either direction within the interior of the receiving portion.

Figure 5:
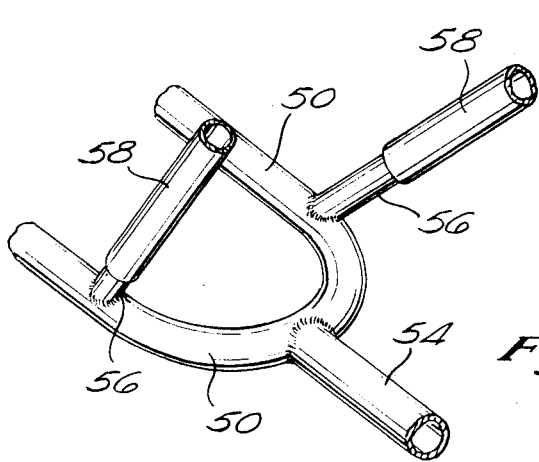
FIG. 5 is a detail perspective view taken about aspect lines 5—5 of FIG. 1 illustrating the interconnection of the front fork and infant support frame segments of the preferred embodiment of the present invention.

To interconnect the segments of the preferred embodiment of the present invention, second rear axle segment 16 is connected to first rear axle segment 14 by inserting right rear axle portion 46 into the free end of left rear axle portion 38 until retaining button 66 engages aperture 66' as shown in FIG. 4. Front fork segment 12 is then connected to first rear axle segment 14 by inserting forward spine portion 54 into the free end of rear spine porton 42 until retaining button 68 engages first position aperture 68A, thus forming a platform structure supported by wheels 40, 48, 52. Infant support segment 10 is then connected to segments 12 and 14 wherein post portions 56 are inserted into the forward ends 58 of support member lateral portions 26 and seat post 36 is inserted into the upper end of seat post receiving portion 44 until retaining button 70 engages aperture 70' as shown in FIGS. 5 and 4 respectively (the angle of lower support member 32 can be adjusted via pivotal connections 34 to facilitate to the alignment of portions 36 and 44). With the segments assembled in this first position, retaining button 68 is then disengaged from first position aperture 68A by depressing it inwardly back therethrough and then inserting forward spine portion 54 further into rear spine portion 42 until retaining button 68 engages second position aperture 68B, causing the frame of the present invention to compress and thereby form a rigid structure.

The frame segments 10, 12, 14, and 16 may be disconnected in reverse manner as for stowage by depressing the retaining button at each connection inwardly back through its receiving aperture to disengage the corresponding insert and receiving portions which are then slidingly pulled apart.

From the above it will be recognized that the segments comprising the jogging stroller of the present invention can be rapidly interconnected and subsequently disconnected without the need for any tools whatsoever. As such, the present invention can be rapidly disassembled and the segments arranged into a compact configuration permitting them to be stowed in places where space is limited, such as a room closet, an automobile trunk, a vehicle luggage rack or other form of vehicle stowage area. When stowage space is even more limited, the separate segments can be dividedly stowed in different locations within a stowage compartment or even within different compartments such as an automobile trunk and rear passenger area. It will be further recognized that the disconnected infant support segment 10 can be made even more compact for stowage by folding lower support member 32 toward upper support member 22 via the pivotal connections 34.

Although the present invention has been described herein with reference to specific design configurations, methods of construction and materials, those skilled in the art will recognize that modifications to the same can be made without departing from the spirit of the present invention and such modifications are contemplated herein.

What is claimed is:
1. A three wheeled stroller comprising:
   a base frame formed of an elongate longitudinal spine member having a front end and a rear end, the rear end of said elongate longitudinal spine member being connected normally to a transverse rear axle member to form a generally T-shaped base frame configuration;
   a front wheel receiving fork formed on the front end of said longitudinal spine member of said base frame;
   an inclined upper frame assembly having left and right frame members, a front end, a rear end and a handlebar formed on the rear end thereof;
   a seat suspended from said upper frame assembly;
   a generally U-shaped vertical support member hingedly attached to said left and right frame members of said upper frame assembly and extending between said base frame and said upper frame assembly to hold said upper frame assembly in a substantially fixed position on said base frame;
   means for releasably attaching the lower end of said vertical support member to said spine member and means for releasably attaching the front end of said upper frame assembly to said front wheel receiving fork;
   a front wheel rotatably mounted within said front wheel receiving fork;
   a right rear wheel rotatably mounted on the right end of said transverse rear axle; and
   a left rear wheel rotatably mounted on the left end of said transverse rear axle.
2. The stroller of claim 1 wherein the front end of said upper frame assembly is attached to said T-shaped base frame near the front end of said longitudinal spine member and extends rearwardly and upwardly therefrom.
3. The stroller of claim 1 wherein:

the front end of said upper frame assembly comprises the front terminal ends of said left and right frame member; said terminal ends being adjacent one another; and said base frame further comprises first and second connecting members formed thereon, said first and second connecting members being slidably insertable into the terminal ends of said left and right frame members to establish an interconnection between the front end of said upper frame assembly and said base frame.

4. The stroller of claim 1 wherein said seat is attached to said right and left inclined frame members and wherein S-shaped bends are formed in said right and left frame members, adjacent said seat, to form arm rest regions, on either side of said seat.

5. The stroller of claim 1 wherein said generally U-shaped support member comprises a U-shaped member having upper ends and a bottom point, said bottom point of said bottom point of said U-shaped member being connected to said base frame.

6. The stroller of claim 5 wherein the connection of the bottom point of said U-shaped member to said base frame comprises an additional member extending between the bottom point of said U-shaped member and said base frame.

7. The stroller of claim 6 wherein said additional member comprises a first tubular portion attached to and extending downwardly from the bottom point of said U-shaped member and a second tubular portion attached to and extending upwardly from said base frame, one of said first and second tubular portions being insertable into the other of said first and second tubular portions and a manual locking means being provided for holding said one of said first and said second tubular members in a fixed inserted position within the other of said first and second tubular members.

* * * * *